United States Patent [19]
Hanagata

[11] Patent Number: 5,953,058
[45] Date of Patent: Sep. 14, 1999

[54] WHITE BALANCE CONTROL USING A VERTICAL EDGE DETECTION SIGNAL IN VIDEO SIGNALS

[75] Inventor: Takashi Hanagata, Kanagawa, Japan

[73] Assignee: Sony Corporation, Tokyo, Japan

[21] Appl. No.: 08/747,674

[22] Filed: Nov. 12, 1996

[30] Foreign Application Priority Data

Nov. 20, 1995 [JP] Japan .................................. 7-323583

[51] Int. Cl.[6] ....................................................... H04N 9/73
[52] U.S. Cl. ............................................. 348/223; 348/252
[58] Field of Search ................................... 348/207, 222,
348/223, 224, 225, 226, 227, 228, 252,
253, 655, 656; H04N 5/208, 9/73

[56] References Cited

U.S. PATENT DOCUMENTS

| | | | |
|---|---|---|---|
| 5,420,630 | 5/1995 | Takei | 348/223 |
| 5,568,195 | 10/1996 | Suzuki | 348/227 |

FOREIGN PATENT DOCUMENTS

| | | | |
|---|---|---|---|
| 4-215828 | 6/1990 | Japan | H04N 5/208 |

Primary Examiner—Tuan V. Ho
Attorney, Agent, or Firm—Frommer Lawrence & Haug, LLP; William S. Frommer

[57] ABSTRACT

A video camera capable of controlling white balance according to the color temperature of an object comprises an image pickup device, an edge detecting means for detecting a vertical edge in a signal provided by the image pickup device, a primary color generating means for generating three primary color signals from the signal provided by the image pickup device, and a color temperature calculating means for calculating the color temperature of the object from three primary color signals provided by the primary color generating circuit. The color temperature calculating means reduces the effect of the three primary color signals given thereto by the primary color generating means on calculation when the level of a vertical edge signal is high. A white balance control method of controlling white balance according to a color temperature, comprises a first step of detecting a vertical edge in a signal thereto, a second step of generating three primary color signals from the signal, and a third step of calculating a color temperature from the three primary color signals so that the three primary color signals may not significantly affect calculation when the level of the vertical edge signal is high.

15 Claims, 4 Drawing Sheets

WHITE BALANCE CONTROL USING A VERTICAL EDGE DETECTION SIGNAL IN VIDEO SIGNALS

BACKGROUND OF THE INVENTION

The present invention relates to a video camera capable of controlling the white balance of video signals provided by an image pickup device, such as a CCD (charge-coupled device), and a white balance control method.

A video signal processing circuit included in a related art video camera integrates a chroma signal provided by a chroma signal processing unit which processes video signals provided by an image pickup device to detect the color temperature of an object for white balance control. A signal processor, such as a microcomputer, processes the integral of the chroma signal to calculate the color temperature of the object.

FIG. 3 is a block diagram of the video signal processing circuit of such a related art video camera. The video signal processing circuit has a CCD as a image pickup device, a luminance signal processing unit 10 for producing a luminance signal and a chroma signal from the signals of the CCD output provided on a plurality of lines, and a chroma signal processing unit (CR) 20.

In the video signal processing circuit, a first-line (reference) signal of the CCD output (CCD Sig), and a second-line signal by delaying a (1H preceding) signal of the CCD output by one horizontal scanning interval (1H) through a delay means (1HDL) 1 which delays the signal of the CCD output by one horizontal scanning interval (1H) are given simultaneously to a luminance signal processing unit (Y) 10.

The luminance signal processing unit 10 has a vertical aperture circuit (Vap) 11 for detecting the difference between the first-line signal and the second-line signal. The vertical aperture circuit 11 produces and provides a vertical edge signal (V edge) of an input video signal. The vertical edge signal and the first-line signal are given to a luminance signal processing circuit included in the luminance signal processing unit 10, and then the vertical edge signal and the first-line signal are processed by the luminance signal processing circuit.

The first-line signal and the second-line signal are given to a primary color generation circuit 21 included in the chroma signal processing unit 20. The primary color generation circuit 21 produces a first color difference signal (Cr) and a second color difference signal (Cb) from the first-line signal and the second-line signal, respectively. Therefore, the primary color generation circuit 21 has a first interpixel differential circuit 21-1 that receives the first-line signal, and a second interpixel differential circuit 21-2 that receives the second-line signal. The first color difference signal Cr and the second color difference signal Cb are given to the primary color generation circuit 21 that generates R, G and B primary color signals. The R, G and B primary color signals are given to a built-in chroma signal processing circuit.

The chroma signal processing unit 20 gives the R, G and B primary color signals generated by the primary color generation circuit 21 to a primary color integration circuit 3 (CR-INT), and then the primary color integration circuit 3 integrates the R, G and B primary color signals. Integrals obtained by integrating the R, G and B primary color signals by the primary color integration circuit 3 are given to the microcomputer, and then the microcomputer processes the integrals for color temperature detection to calculate the color temperature of the object. The white balance is adjusted according to the calculated color temperature to display an image in a natural color tone.

An operation of the primary color generation circuit 21 for generating the first color difference signal Cr and the second color difference signal Cb will be explained with reference to FIG. 4.

Shown in FIG. 4 is a portion of a CCD 30 having a color filter array of a checkered complementary color system. An Mg (magenta)filter, a Ye (yellow) filter, a G (green) filter and a Cy (cyan) filter are arranged on the first line. A G filter, a Ye filter, an Mg filter and a Cy filter are arranged on the second line.

Since Mg, Ye and Cy are expressed by R+B, R+G and B+G, respectively. Therefore, a first-line first pixel signal 1S1 is Mg+Ye=2R+G+B, a first-line second pixel signal 1S2 is G+Cy=2G+B, a second-line first pixel signal 2S1 is G+Ye=2G+R, and a second-line second pixel signal 2S2 is Mg+Cy=2B+G+R. A signal of the CCD output, i.e., a reference signal, is provided on the first line, and a (1H preceding) signal of the CCD output is provided on the second line.

The first-line first pixel signal 1S1 and the first-line second pixel signal 1S2 are given to the first interpixel differential circuit 21-1 of the primary color generation circuit 21, and the difference between the pixel signals lS1 and 1S2 is calculated and the first interpixel differential circuit 21-1 provides:

$$1S1-1S2=(2R+G+B)-(2G+B)=2R-G$$

The signal 2R−G is the first color difference signal Cr.

The second-line first pixel signal 2S1 and the second-line second pixel signal 2S2 are given to the second interpixel differential circuit 21-2 of the primary color generation circuit 21, and the difference between the pixel signals 2S1 and 2S2 is calculated and the second interpixel differential circuit 21-2 provides:

$$2S2-2S1=(2B+G+R)-(2G+R)=2B-G$$

The signal 2B−G is the second color difference signal Cb.

The video signal processing circuit of the related art video camera, however, produces a luminance step between the first line and the second line if there is a vertical edge. Therefore, spurious R, G and B primary color signals are produced from the first color difference signals Cr generated from the signal provided on the first line, and the second color difference signal Cb generated from the signal provided on the second line.

Causes of the spurious color signals will be explained with reference to FIG. 5. Suppose that the signal level of the signal of the CCD output rises to the left as indicated by the arrow in a left part of FIG. 5. Then, a vertical edge level step develops between the first line and the second line, if there is a vertical edge.

Consequently, the level of the first color difference signal Cr generated by calculating the difference between the first-line first pixel signal 1S1 and the first-line second pixel signal 1S2 by the first interpixel differential circuit 21-1 of the primary color generating circuit 21 is low because level of the signal of the CCD output provided on the first line is low, while the level of the second color difference signal Cb generated by calculating the difference between the second-line first pixel signal 2S1 and the second-line second pixel signal 2S2 by the second interpixel differential circuit 21-2 of the primary color generating circuit 21 is high because level of the signal of the CCD output provided on the second line is high.

Since the respective levels of the first color difference signal Cr and the second color difference signal Cb are different from each other, the R, G and B primary color signals generated by processing the first color difference signal Cr and the second color difference signal Cb are spurious color signals different from R, G and B primary color signals representing the original color of the object.

SUMMARY OF THE INVENTION

Accordingly, it is an object of the present invention to provide a video camera which does not generate an integral signal including spurious color signals even if there is a vertical edge.

Another object of the present invention is to provide a white balance control method which does not generate an integral signal including spurious color signals even if there is a vertical edge.

According to a first aspect of the present invention, a video camera capable of controlling white balance according to the color temperature of an object comprises an image pickup device, an edge detecting means for detecting a vertical edge in a signal provided by the image pickup device, a primary color generating means for generating three primary color signals from the signal provided by the image pickup device, and a color temperature calculating means for calculating the color temperature of the object from three primary color signals provided by the primary color generating circuit. The color temperature calculating means reduces the effect of the three primary color signals given thereto by the primary color generating means on calculation when the level of a vertical edge signal is high.

According to a second aspect of the present invention, a white balance control method for controlling white balance according to color temperature comprises a first step of detecting a vertical edge in a signal, a second step of generating three primary color signals from the signal, and a third step of calculating a color temperature from the generated three primary color signals so that the three primary color signals may not affect calculation significantly when the level of the vertical edge signal is high.

According to the present invention, a primary color integrating circuit makes every effort to avoid integrating spurious signals even if there is a step due to a vertical edge between luminance signals given through a pair of lines to a primary color generating circuit by stopping its integrating action when there is a vertical edge or by controlling the levels of R, G and B primary color signals on the basis of a luminance step.

Accordingly, the inclusion of spurious color signals in a integral signal provided by the primary color integrating circuit can be avoided to the utmost and hence a color temperature of improved accuracy can be calculated from the integral signal.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
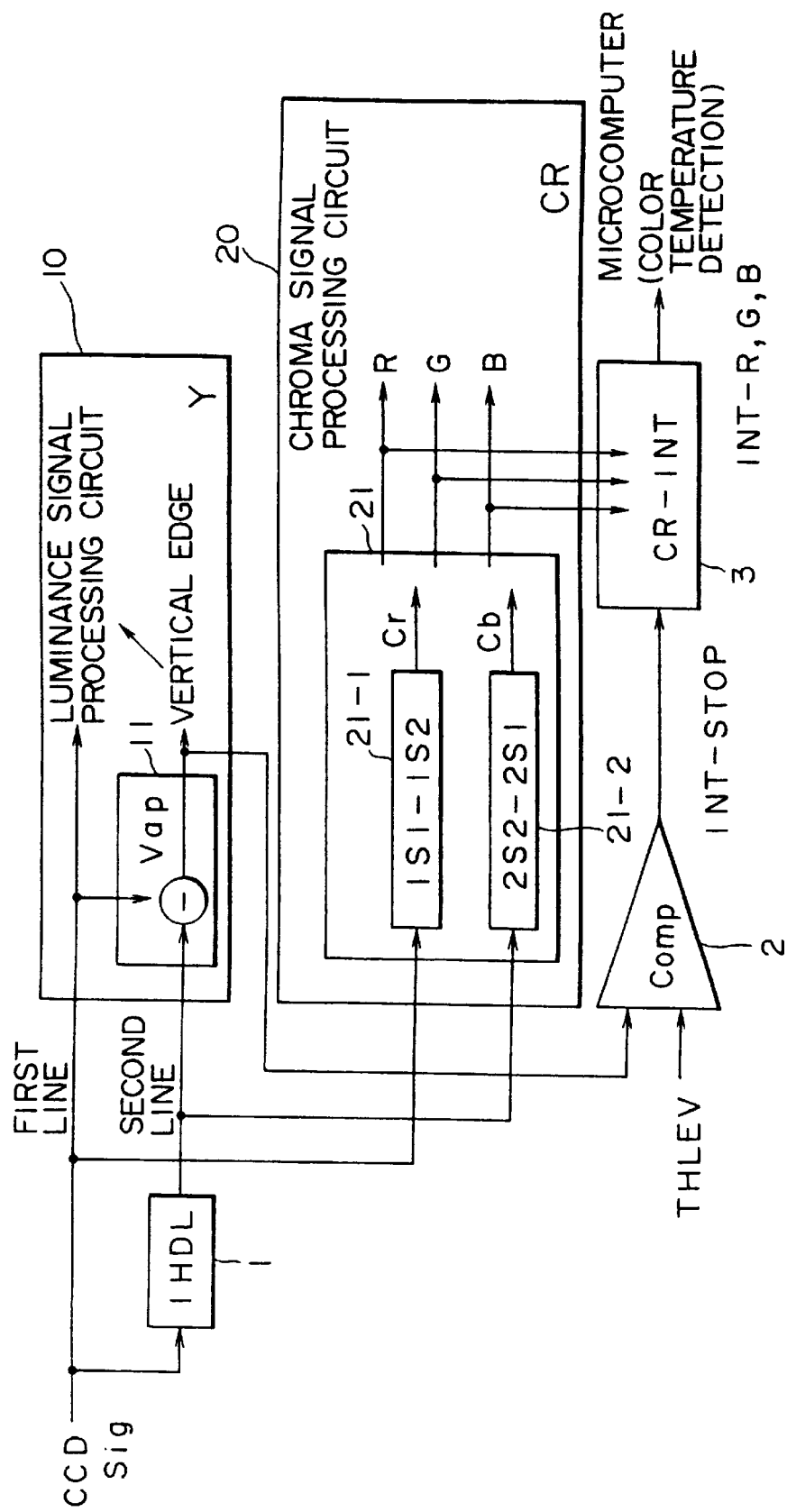
FIG. 1 is a block diagram of a video signal processing circuit in a first embodiment according to the present invention.

Referring to FIG. 1 showing a video signal processing circuit in a first embodiment according to the present invention, there are shown a CCD (charge-coupled device), i.e., an image pickup device, a luminance signal processing unit 10 for generating a luminance signal and a chroma signal from the signals of the CCD output provided on at least two lines, and a chroma signal processing unit 20.

In this video signal processing circuit, a first-line (reference) signal of the CCD output (CCD Sig), and a second-line signal by delaying a (1H preceding) signal of the CCD output by one horizontal scanning interval (1H) by a delay means (1HDL) 1 which delays the signal of the CCD output by one horizontal scanning interval (1H) are given simultaneously to the luminance signal processing unit (Y) 10.

The luminance signal processing unit 10 has a vertical aperture circuit (Vap) 11 for detecting the difference between the first-line signal and the second-line signal. The vertical aperture circuit 11 produces and provides a vertical edge signal (V edge)of an input video signal. The vertical edge signal and the first-line signal are given to a luminance signal processing circuit included in the luminance signal processing unit 10, and then the vertical edge signal and the first-line signal are processed by the luminance signal processing circuit to generate a luminance signal, and the vertical edge signal is applied to one of the input terminals of a comparator (Comp) 2, which will be described later.

The first-line signal and the second-line signal are given to a primary color generation circuit 21 included in the chroma signal processing unit 20. The primary color generation circuit 21 generates a first color difference signal (Cr) and a second color difference signal (Cb) from the first-line signal and the second-line signal, respectively. Therefore, the primary color generation circuit 21 has a first interpixel differential circuit 21-1 that receives the first-line signal, and a second interpixel differential circuit 21-2 that receives the second-line signal. R, G and B primary color signals are generated from the first color difference signal Cr and the second color difference signal Cb. The R, G and B primary color signals are given to a built-in chroma signal processing circuit.

The chroma signal processing unit 20 gives the R, G and B primary color signals generated by the primary color generation circuit 21 to a primary color integration circuit 3 (CR-INT), and then the primary color integration circuit 3 integrates the R, G and B primary color signals. Integrals obtained by integrating the R, G and B primary color signals by the primary color integration circuit 3 are given to a microcomputer, and then the microcomputer processes the integrals for color temperature detection to calculate the color temperature of the object. The white balance is adjusted according to the calculated color temperature to display an image in a natural color tone.

The integrating action of the primary color integration circuit 3 is controlled by the comparator 2. As mentioned above, the vertical edge signal is applied to one of the input terminals of the comparator 2, and a threshold level (THLEV) is applied to the other input terminal of the comparator 2. The comparator 2 provides an integration stop signal (INT-STOP) to stop the integrating action of the primary color integration circuit 3 when the level of the vertical edge signal exceeds the threshold level.

Consequently, when the level of the detected vertical edge signal is high and there is the possibility that the primary color generating circuit 21 generates a spurious signal, the integrating action of the primary color integration circuit 3 is stopped so that the integration of the spurious signal by the primary color integration circuit 3 can be avoided. Therefore, the microcomputer, which receives the integral signal from the primary color integration circuit 3, is able to calculate an accurate color temperature.

The threshold level may be determined taking into consideration the levels of spurious R, G and B primary color signals relative to the level of the vertical edge signal.

A video signal processing circuit in a second embodiment according to the present invention will be described with reference to FIG. 2A, in which parts like or corresponding to those shown in FIG. 1 are designated by the same reference characters and the description thereof will be omitted.

Figure 2:
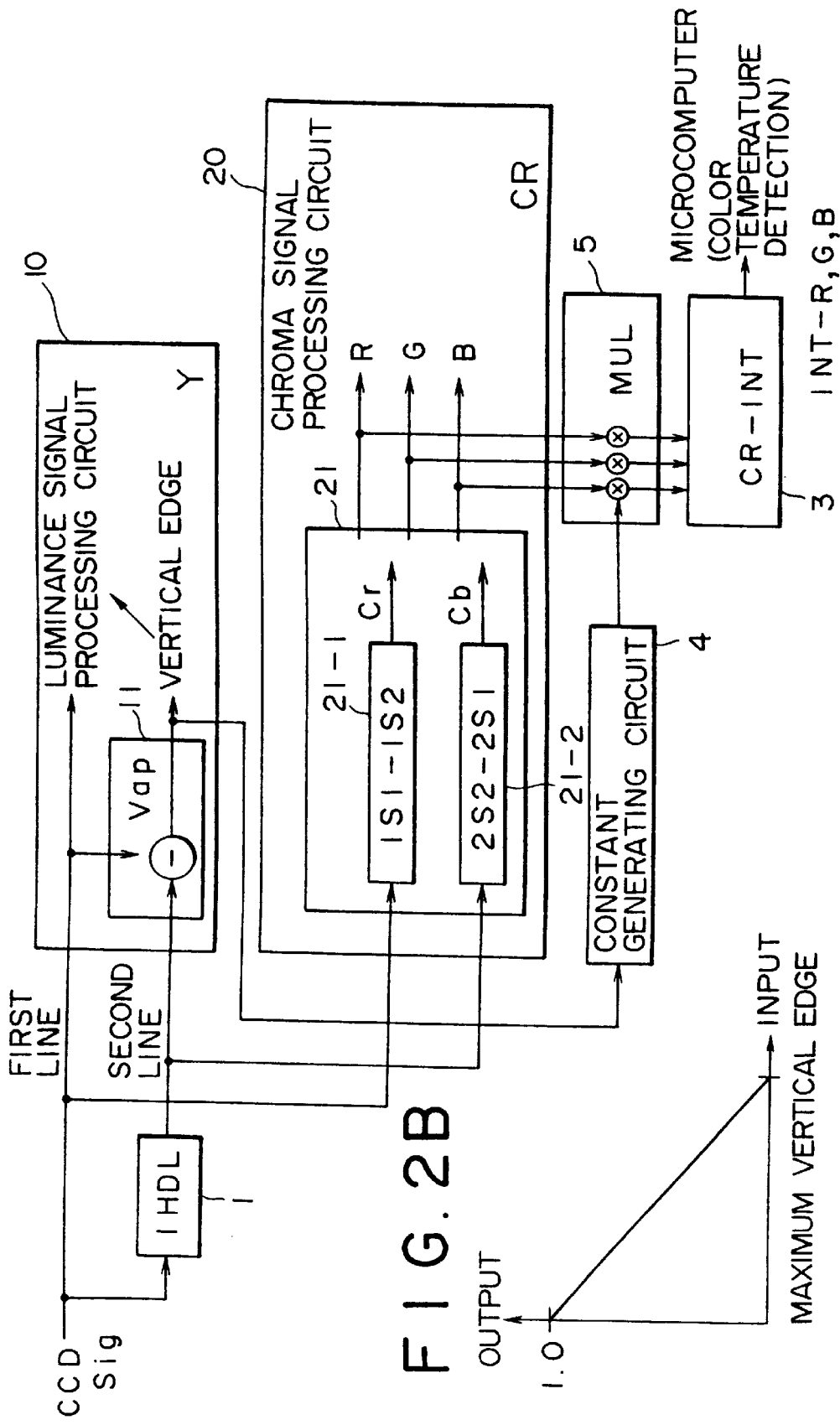
FIGS. 2A and 2B are a block diagram of a video signal processing circuit in a second embodiment according to the present invention and a graph showing the input/output characteristics of a constant generating circuit, respectively.
Figure 3:
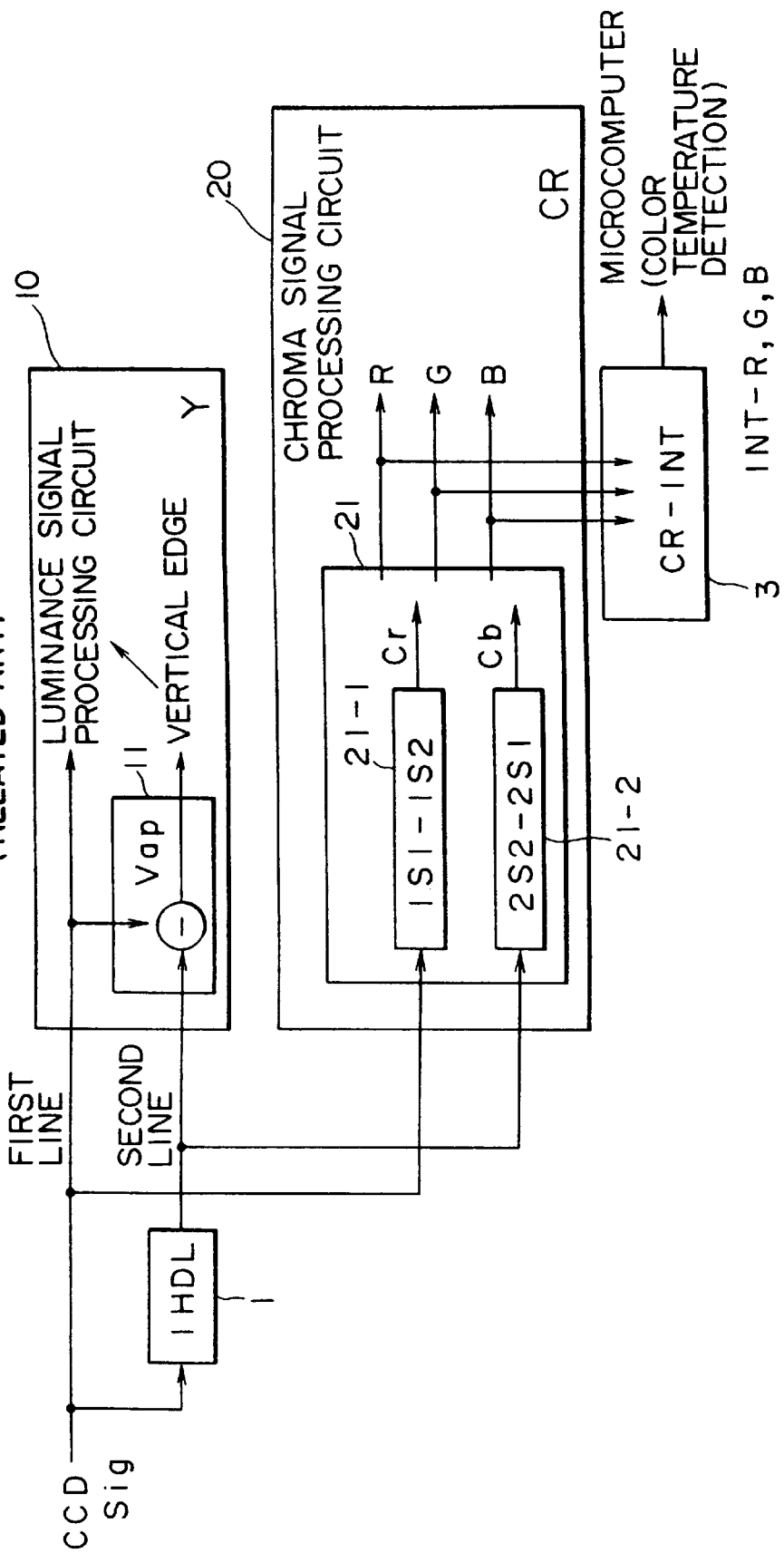
FIG. 3 is a block diagram of a conventional video signal processing circuit.
Figure 4:
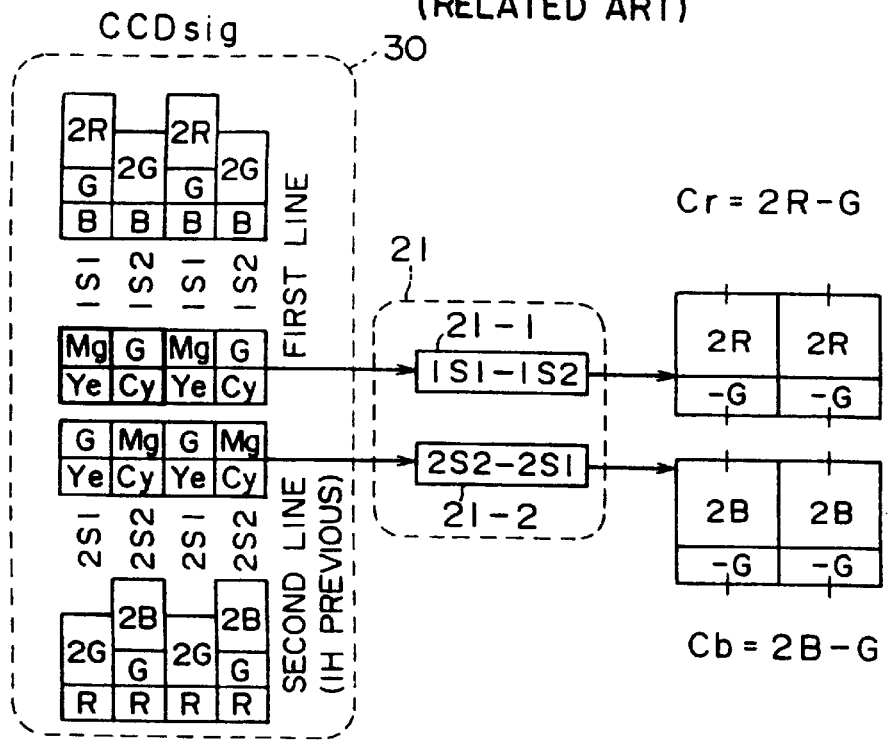
FIG. 4 is a diagrammatic view of assistance in explaining the operation of a primary color generating circuit.
Figure 5:
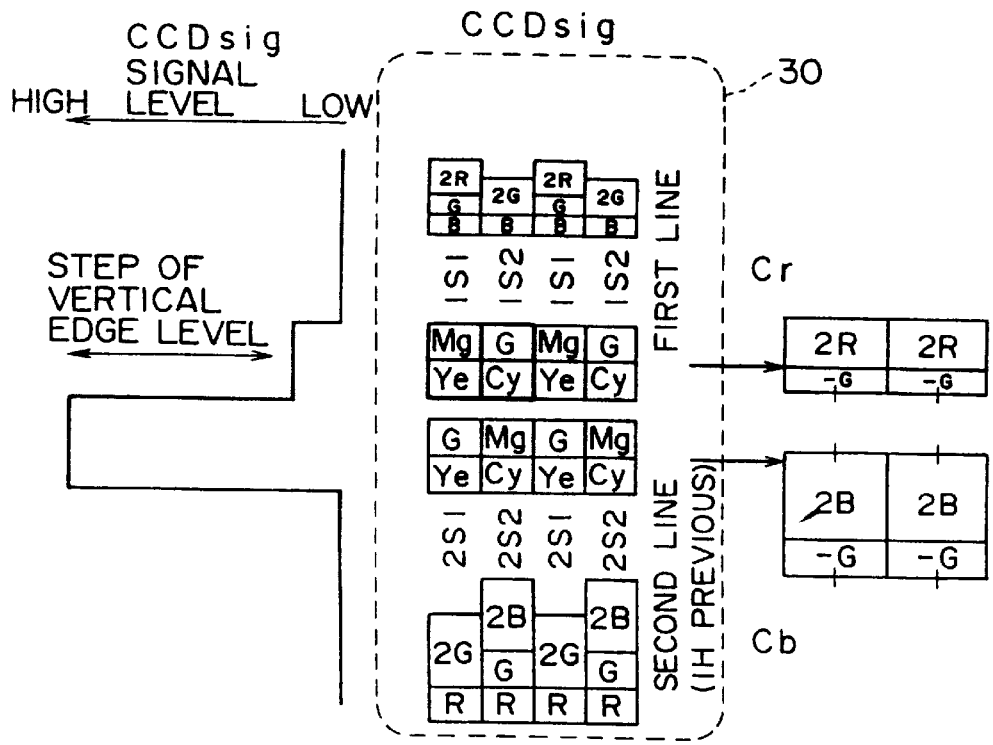
FIG. 5 is a diagrammatic view of assistance in explaining the generation of spurious signals by the primary color generating circuit.

As shown in FIG. 2A, the video signal processing circuit, similarly to that shown in FIG. 1, has a CCD (charge-coupled device), i.e., an image pickup device, a luminance signal processing unit 10 for generating a luminance signal and a chroma signal from the signals of the CCD output provided on at least two lines, and a chroma signal processing unit 20.

The video signal processing circuit in the second embodiment prevents the generation of an integral signal including a spurious signal even if there is a vertical edge by the following method.

A constant generating circuit 4 receives a vertical edge signal, and gives a constant corresponding to the level of the vertical edge signal to a constant multiplying circuit (MUL) 5 which multiplies R, G and B primary color signals provided by the chroma signal processing unit 20 by the constant given thereto.

Therefore, the primary color integration circuit 3 integrates multiplied R, G and B primary color signals obtained by multiplying the R, G and B primary color signals generated by the primary color generating circuit 21 of the chroma signal processing unit 20 by the constant.

The constant generating circuit 4 provides a constant (gain of 1.0 or below) to lower the levels of the R, G and B primary color signals when the level of the vertical edge signal is high, and provides a constant (gain of about 1.0) not to change the levels of the R, G and B primary color signals when the level of the vertical edge signal is low. As shown in FIG. 2B, the output of the constant generating circuit 4 varies linearly with the level of the vertical edge signal; the constant generating circuit 4 provides zero when the level of the vertical edge signal is a maximum and provides 1.0 when the level of the vertical edge signal is zero.

The constant multiplying circuit 5 multiplies the R, G and B primary color signals by the constant provided by the constant generating circuit 4. Therefore, when spurious R, G and B primary color signals are generated, the levels of the spurious R, G and B primary color signals are controlled according to the level of the vertical edge signal, so that the multiplied R, G and B primary color signals provided by the constant multiplying circuit 5 are approximately equal to true, natural R, G and B primary color signals.

Thus, the inclusion of spurious color signals in an integral signal provided by the primary color integrating circuit can be avoided to the utmost and hence a color temperature of improved accuracy can be calculated from the integral signal.

Since the integrating operation is stopped or the levels of the R, G and B primary color signals are controlled on the basis of the luminance step, the primary color integration circuit is able to avoid integrating spurious signals even if there is a step due to a vertical edge between the luminance signals given through the pair of lines to the primary color generating circuit.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A video camera for controlling white balance according to a color temperature of an object, comprising:

an image pickup device;

edge detecting means for detecting a vertical edge in a signal provided by said image pickup device;

primary color generating means for generating three primary color signals from said signal provided by said image pickup device; and color temperature calculating means for calculating the color temperature of said object from the generated three primary color signals, said color temperature calculating means including an integration circuit for integrating the generated three primary color signals;

wherein said color temperature calculating means reduces the effect of the generated three primary color signals on calculation when a level of the detected vertical edge signal is higher than a predetermined threshold level.

2. The video camera according to claim 1, wherein said image pickup device is a color-coded CCD.

3. The video camera according to claim 1, wherein said edge detecting means calculates a level difference between an output signal of said image pickup device and a signal obtained by delaying said output signal of said image pickup device by one horizontal scanning interval, said edge detecting means providing an edge signal representing said level difference.

4. The video camera according to claim 1, wherein said primary color generating means generates said three primary color signals from an output signal of said image pickup device, and a delayed signal is obtained by delaying said output signal of said image pickup device by one horizontal scanning interval.

5. The video camera according to claim 4, wherein said primary color generating means comprises:

a first differential circuit for calculating a difference between adjacent pixels of an output signal of said image pickup device and for providing a first color difference signal; and a second differential circuit for calculating a difference between adjacent pixels of a delayed signal obtained by delaying said output signal of said image pickup device by one horizontal scanning interval and for providing a second color difference signal.

6. The video camera according to claim 1, further comprising comparing means for comparing the detected vertical edge signal and said predetermined threshold level, wherein said color temperature calculating means does not integrate said three color signals provided by said primary color generating means when the level of the vertical edge signal is higher than said predetermined threshold level.

7. The video camera according to claim 1, further comprising constant generating means for generating a constant according to a magnitude of said vertical edge signal provided by said edge detecting means, and multiplying means for multiplying said three primary color signals provided by said primary color generating means by said constant provided by said constant generating means.

8. The video camera according to claim 7, wherein said constant generating means generates said constant closer to 0 (zero) for said vertical edge signal of a greater magnitude, and generates said constant closer to 1 (one) for said vertical edge signal of a smaller magnitude.

9. A white balance control method for controlling white balance according to a color temperature, comprising the steps of:

detecting a vertical edge in an input signal;

generating three primary color signals from said input signal; and calculating a color temperature from the generated three primary color signals so that the generated three primary color signals may not significantly affect calculation when a level of the detected vertical edge signal is higher than a predetermined threshold level, said calculating step including integrating the generated three primary color signals.

10. The white balance control method according to claim 9, wherein said vertical edge is detected by calculating a level difference between said input signal and a signal obtained by delaying said input signal by one horizontal scanning interval.

11. The white balance control method according to claim 9, wherein said three primary color signals are generated from said input signal and a delayed signal obtained by delaying said input signal by one horizontal scanning interval.

12. The white balance control method according to claim 11, further comprising calculating a difference between adjacent pixels of said input signal and providing a first color difference signal;

calculating a difference between adjacent pixels of the delayed signal obtained by delaying said input signal by one horizontal scanning interval and providing a second color difference signal; and generating said three primary color signals from said first and second color difference signals.

13. The white balance control method according to claim 9, further comprising comparing the detected vertical edge signal and said predetermined threshold level, wherein integration of the three primary color signals is not carried out when said level of the detected vertical edge signal is higher than said predetermined threshold level.

14. The white balance control method according to claim 9, further comprising generating a constant according to a magnitude of the detected vertical edge signal, and multiplying the generated three primary color signals by the generated constant.

15. The white balance control method according to claim 14, wherein the generated constant is closer to 0 (zero) for said vertical edge signal of a greater magnitude, and the generated constant is closer to 1 (one) for said vertical edge signal of a smaller magnitude.

* * * * *